(12) United States Patent
Teraoka et al.

(10) Patent No.: US 6,698,562 B2
(45) Date of Patent: Mar. 2, 2004

(54) COUPLING FOR VEHICLE

(75) Inventors: Masao Teraoka, Tochigi (JP); Nobushi Yamazaki, Tochigi (JP); Yoshiaki Kato, Fuji (JP); Kouichi Iizuka, Fuji (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 11 days.

(21) Appl. No.: 10/028,226

(22) Filed: Dec. 21, 2001

(65) Prior Publication Data

US 2002/0134635 A1 Sep. 26, 2002

(30) Foreign Application Priority Data

Feb. 28, 2001 (JP) ........................ 2001-054993

(51) Int. Cl.[7] ........................... F16D 27/00; F16D 47/00
(52) U.S. Cl. ........................... 192/35; 192/84.7
(58) Field of Search ............... 192/35, 70.23, 192/84.7

(56) References Cited

U.S. PATENT DOCUMENTS

| 2,649,941 A | * | 8/1953 | Doebeli ........... 192/35 |
| 2,801,719 A | | 8/1957 | Clerk |
| 4,286,701 A | | 9/1981 | MacDonald |
| 6,092,633 A | * | 7/2000 | Morisawa ........... 192/35 |
| 6,315,096 B1 | * | 11/2001 | Dairokuno et al. ........... 192/35 |
| 6,446,772 B1 | * | 9/2002 | Inose et al. ........... 192/35 |

FOREIGN PATENT DOCUMENTS

| DE | 274956 | 4/1951 |
| EP | 1081402 | 3/2001 |
| GB | 324950 | 2/1930 |

* cited by examiner

Primary Examiner—Rodney H Bonck
(74) Attorney, Agent, or Firm—Morrison & Foerster LLP

(57) ABSTRACT

A coupling for a vehicle includes a pilot clutch 15, a main clutch 13, a pressing system 21 and a coupling mechanism 17. The pilot clutch 15 generates a pilot torque and is operated by operating means 19. The main clutch 13 connects torque members 11 and 9 and transmits transmitted torque. The coupling mechanism 17 operated by the pilot torque converts the pilot torque into a pressing force for coupling the main clutch 13 via the pressing system 21 by use of a cam thrust force thereof. The main clutch 13 is disposed outside the pilot clutch 15 in a radial direction, and respective members of the pressing system 21 are mutually positioned and designed to move unitarily in a pressing direction, thus sliding portions caused by the main clutch 13 is connecting and disconnecting are limited to being on a side of the main clutch 13.

10 Claims, 4 Drawing Sheets

COUPLING FOR VEHICLE

BACKGROUND OF THE INVENTION

1. Field of the Invention

The present invention relates to a coupling for a vehicle, for use in a power transmission clutch such as a starting clutch of a vehicle.

2. Description of the Related Art

In order to improve road ability, starting and acceleration ability of a vehicle, stability of the vehicle body, and the like, precise control of torque transmission is required of a coupling for a vehicle for use in a power transmission clutch of a vehicle.

A constitution of an electromagnetic coupling 301 as a comparative art is shown in FIG. 3.

A pressing member 319 of a ball cam 317 is coupled to a hub 305 in a spline portion 325. When the ball cam 317 is activated, the pressing member 319 slides along a drive pinion shaft 321. In this case, the pressing member 319 receives frictional resistance generated in the spline portion 325.

A frictional force Fs generated in the spline portion 325 is expressed by the following equations:

where  Fs = F × μ    equation (1)
       F  = Ts/r     equation (2)
       Fs: frictional force generated on a gear surface
       Ts: transmitted torque
       F:  force generated on the gear surface by receiving the transmitted torque Ts
       r:  distance (radius) from a shaft center to the gear surface
       μ:  frictional coefficient of the gear surface In the case of the coupling 301, the spline portion 325 is small in diameter. Specifically, in the equation (2), r is small, and in the equation (1), Fs is large. In other words, the frictional resistance generated in the spline portion 325 is large.

FIG. 4 shows change in transmitted torque (T) to current value (I) exciting an electromagnet 313.

Solid-line curves 203 and 205 indicate respective changes in theoretical transmitted torque (T) of the coupling 301 when the foregoing current value (I) is changed.

Owing to the frictional resistance generated in the spline portion 325, large hysteresis is generated as indicated by the curves 203 and 205.

Accordingly, it becomes difficult to precisely control the torque transmission, and thus it becomes difficult to improve road ability, starting and acceleration ability, stability of the vehicle body, and the like. Moreover, it becomes also difficult to make precise corrections for secular change in the coupling.

As a countermeasure to this, a method is conceived in which the transmitted torque (T) is detected by use of a torque sensor. However, a complicated structure and high cost are unavoidable in this method. Moreover, there remains the fundamental problem of the large hysteresis generated in the control system.

SUMMARY OF THE INVENTION

The object of the present invention is to provide a coupling for a vehicle, which is capable of controlling the torque transmission more precisely without using any special means to bring about a cost increase, by reducing the hysteresis when the transmitted torque is increased and decreased.

A first aspect of the present invention is a coupling for a vehicle, comprising: a pilot clutch for generating a pilot torque, the pilot clutch being operated by an operating means; a main clutch for transmitting the transmitted torque, connecting an input torque member and an output torque member, the main clutch being disposed outside the pilot clutch in a radial direction, to which main sliding portions that slide when receiving the transmitted torque are limited; a pressing system comprising any of a unitary member and a plurality of members mutually positioned, the pressing system moving unitarily in a pressing direction; and a coupling mechanism operated by the pilot torque, converting the pilot torque into a pressing force for coupling the main clutch via the pressing system, and amplifying the pressing force.

In such a manner, the main sliding portions are limited to be on the side of the large-diameter main clutch, and thus the distance (radius) r from the shaft center to the gear surface in the foregoing equation (2) becomes large, and the force F generated on the gear surface by receiving the transmitted torque (T) becomes small. Furthermore, if F becomes small, the frictional force Fs generated on the gear surface becomes small in the equation (1).

If the frictional force Fs of the sliding portions receiving the transmitted torque becomes small, then the frictional resistance applied to the pressing system of the main clutch becomes small. Thus, the transmitted torque quickly responds to the increase and the decrease of the current controlling torque transmission.

In the case of disposing the coupling as a power transmission member or of using the coupling in a starting clutch, more precise control of the torque transmission is accomplished, and road ability, starting and acceleration ability, and stability of the vehicle body and the like can be improved to a great extent.

Moreover, correction of the torque transmission in response to secular change of each portion is performed more accurately.

As described above, since the coupling of the present invention can control the torque transmission precisely for a long period of time and stabilize the same, the coupling of the present invention is suitable as apparatus such as the power transmission member and the starting clutch of a vehicle.

Moreover, due to small frictional resistance, a system for detecting transmitted torque by use of a torque sensor is not necessary, thus making it possible to avoid complication of the structure and cost increase, which would accompany the use of such a system.

Moreover, the main clutch is disposed outside the pilot clutch in a radial direction and is made large in diameter, and thus a large torque transmission capacity can be obtained. Accordingly, the main clutch can be constituted to be compact in the axial direction, interference thereof with peripheral members is prevented, and the degree of freedom in layout is increased.

A second aspect of the present invention is the coupling according to the first aspect, wherein the main clutch and the pilot clutch are disposed in a lapped manner in a radial direction. The second aspect can obtain an operation and an effect similar to those in a constitution of the first aspect.

Moreover, the main clutch and the pilot clutch are disposed in the lapped manner in a radial direction, and thus, in the case of using a lubrication mechanism to flushingly supply oil from a shaft center in a radial direction, lubricant oil can be efficiently supplied to the pilot clutch and the main clutch. Therefore, the pilot clutch and the main clutch can be sufficiently lubricated and cooled, and the durability thereof can be greatly improved.

Note that a phrase, "disposed in a lapped manner", mentioned herein means that a part or the entirety of a projection of the main clutch in a radial direction is lapped over a projection of the pilot clutch in a radial direction.

A third aspect of the present invention is the coupling according to the first aspect, wherein the main clutch and the pilot clutch comprise outer plates and inner plates, the coupling mechanism comprises a first member and a second member, the pressing system comprises the pilot clutch, the second member of the coupling mechanism, and an outer member, the outer member being connected to the outer plates of the main clutch and the pilot clutch, the outer member being connected to any of the input torque member and the output torque member movably in a pressing direction, and the main sliding portions are limited to being between the outer member and the torque member to which the outer member is connected, between the outer member and the outer plates, or between the inner plates and an inner member, the inner member being connected to the inner plates of the main clutch, the inner member being connected to the first member of the coupling mechanism. The third aspect can obtain an operation and an effect equivalent to those in the constitution of the first aspect.

A fourth aspect of the present invention is the coupling according to the third aspect, wherein the pilot clutch, the second member of the coupling mechanism, and the outer member maintain a positional relation among themselves whilst the pressing system moves. The fourth aspect can obtain an operation and an effect equivalent to those in a constitution of the third aspect.

Moreover, since no change occurs in the relative positional relation among the respective members constituting the pressing system, there are no elements to generate frictional resistance among the members of the pressing system, thus enables the torque transmission to be controlled precisely for a long period of time and to be stabilized.

A fifth aspect of the present invention is the coupling according to the first aspect, wherein the operating means comprises an electromagnet. The fifth aspect can obtain an operation and an effect equivalent to those in the constitution of the first aspect.

In addition, the electromagnet is used as the operating means of the pilot clutch, and thus, for example, unlike in a pressure system, a pump, a driving source and a pipe thereof and the like are not required. Accordingly, since the coupling has a simple structure, the coupling is low in cost, lightweight and compact, with excellent mounting capabilities, and can achieve high reliability owing to no pressure leak.

Moreover, a torque transmission characteristic can be controlled and secular change thereof can be corrected precisely by adjusting the excitation current. And a torque transmission characteristic further stabilized for a long period of time can be obtained.

A sixth aspect of the present invention is the coupling according to the fifth aspect, wherein the electromagnet is fitted in a non-rotational state to a rotor connected to the outer member with a bearing interposed therebetween. The sixth aspect can obtain an operation and an effect equivalent to those in a constitution of the fifth aspect.

In addition to this, since the electromagnet is fitted in a non-rotational state to the rotor coupled to the outer member with a bearing interposed therebetween, the electromagnet moves in an axial direction together with the outer member and the rotor when the clutch is connected and disconnected. However, the electromagnet itself is non-rotational. Accordingly, a special electricity-supplying means for a rotating body such as a slip ring is not necessary, and thus wiring and installation thereof are facilitated.

BRIEF DESCRIPTION OF THE DRAWINGS

The invention will now be described with reference to the accompanying drawings, wherein.

DETAILED DESCRIPTION OF THE PREFERRED EMBODIMENT

Figure 1:
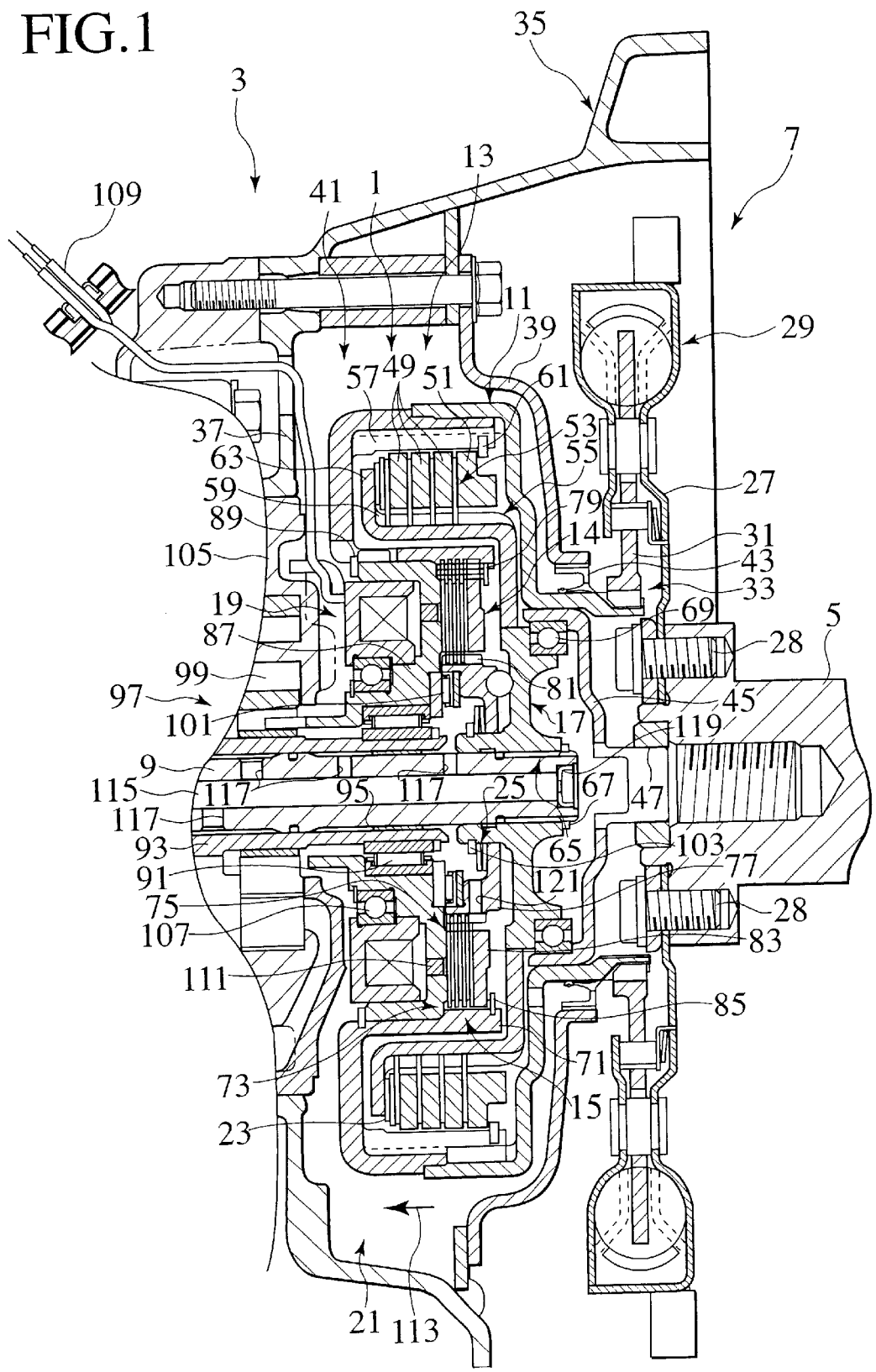
FIG. 1 is a sectional view of an embodiment of the present invention.

An embodiment of the present invention will be explained below with reference to the drawings, wherein like numbers are designated by like reference characters.

Note that, in the description below, right and left directions described are right and left directions in FIG. 1, and members and the like without reference numerals added thereto are not illustrated.

Figure 3:
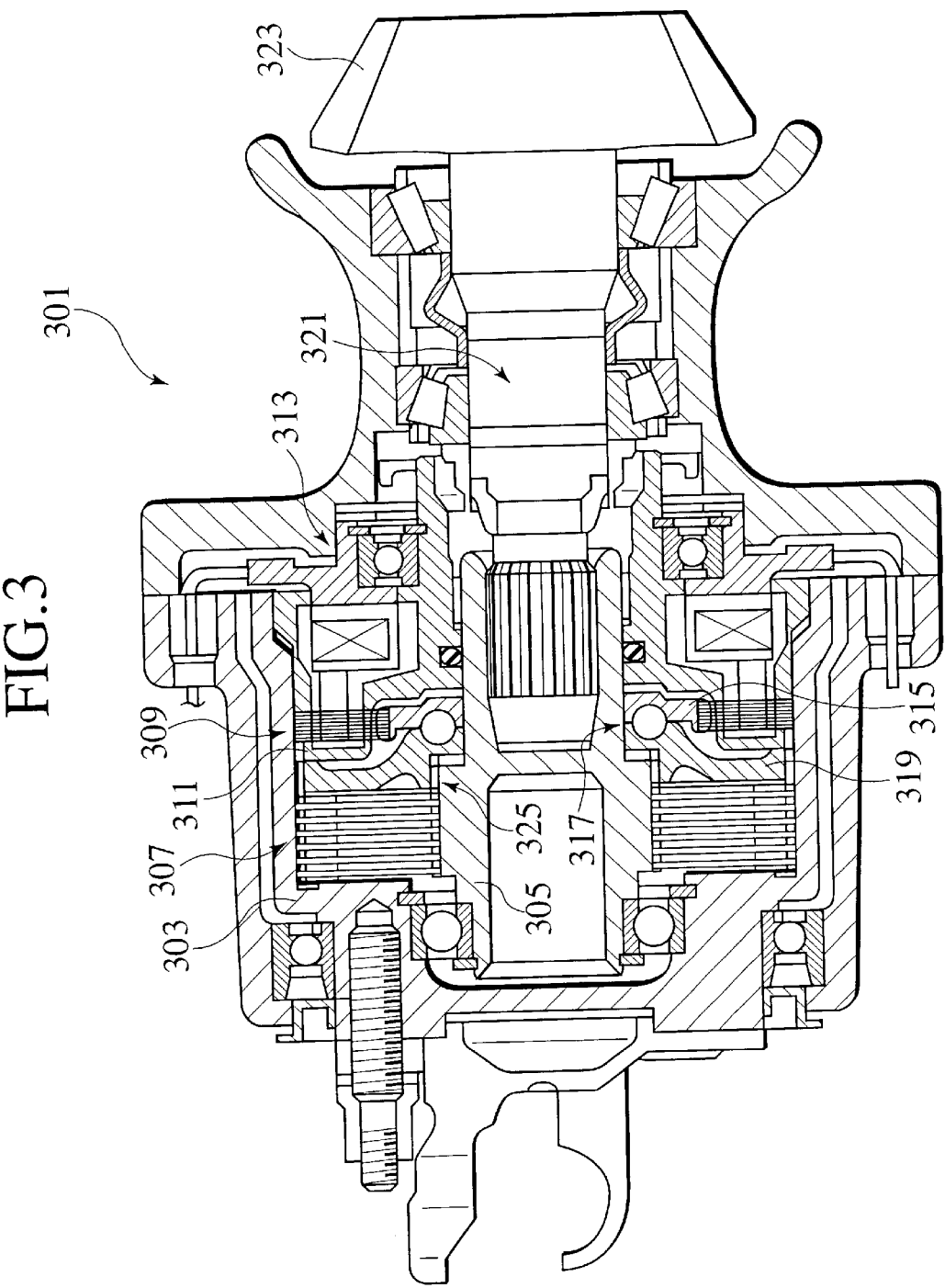
FIG. 3 is a sectional view of a comparative art.
Figure 4:
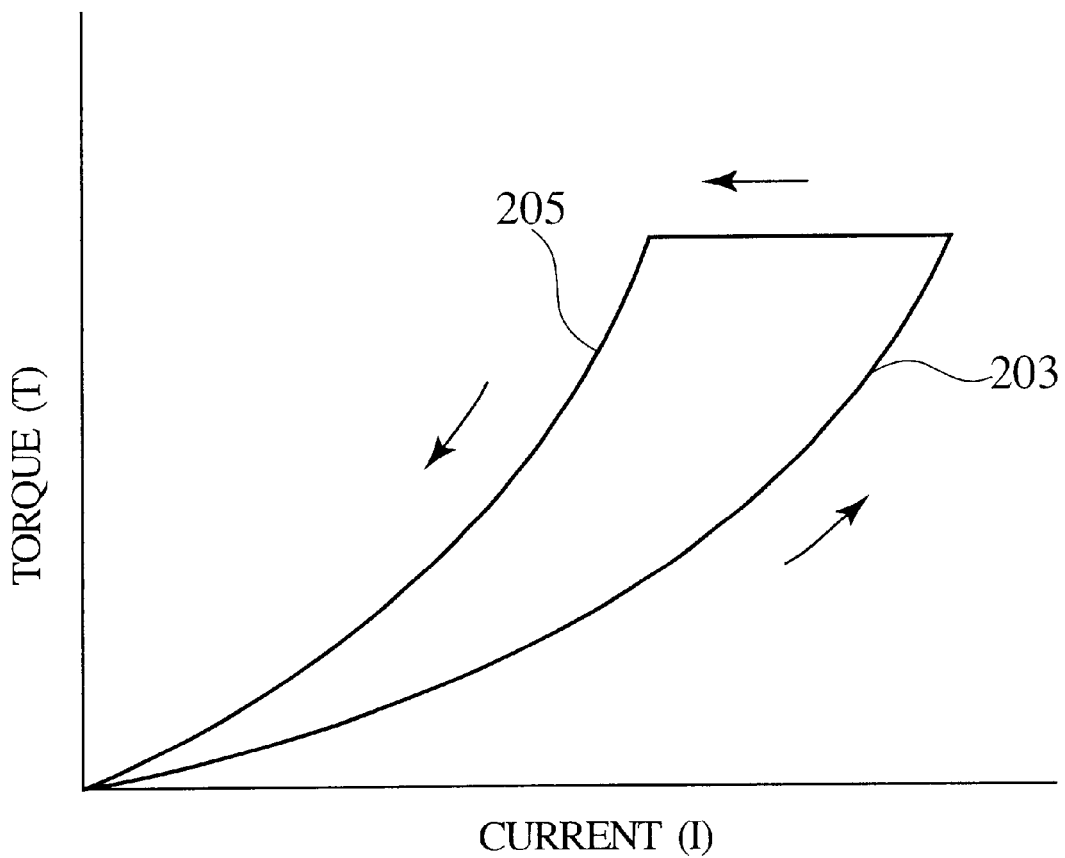
FIG. 4 is a graph showing change in transmitted torque (T) to current value (I) when the transmitted torque is increased and decreased in the coupling of the comparative art; the graph showing the large hysteresis generated by the comparative art.

Description will be made of a starting clutch (coupling) as one embodiment to which the present invention is applied with reference to FIGS. 3 and 4.

The starting clutch 1 which is shown in FIG. 1 is used in a power transmission apparatus 3 of a vehicle. On the right-hand side of the starting clutch 1, an engine is disposed, and on the left-hand side thereof, a multi-speed automatic transmission (AT) is disposed.

The power transmission apparatus 3 is constituted of a crankshaft 5 of the engine, a damper 7, the starting clutch 1, an output shaft 9 (an output torque member) coupled to an automatic transmission mechanism and the like.

The starting clutch 1 is constituted of a clutch housing 11 (an input torque member), a multi-plate main clutch 13 and a pilot clutch 15, a ball cam 17 (coupling mechanism), an electromagnet 19 (operating means), a pressing system 21, Belleville springs 23 and 25, a controller and the like.

To the crankshaft 5, a flange member 27 is fixed with bolts 28, and to the flange member 27, a ring 31 is coupled with a spring 29 interposed therebetween, and thus constituting a damper 7.

The ring 31 is coupled to the clutch housing 11 of the starting clutch 1 by a spline portion 33. The damper 7 absorbs the shock due to abrupt change in the engine revolution by a damper function of the spring 29, and shields the vibration of the engine from being transmitted to the starting clutch 1.

A compartment 41 is formed by compartment wall members 37 and 39 in a casing 35 accommodating the power transmission apparatus 3, and the starting clutch 1 is accommodated in this compartment 41. Between the compartment wall member 39 and the clutch housing 11, disposed is a seal 43, which prevents oil leak to the damper 7.

A support member 45 is welded to the clutch housing 11. This support member 45 is freely rotatably engaged with a support hole 47 defined in the crankshaft 5, and supports the clutch housing 11.

The main clutch 13 is composed of three outer plates 49, one outer plate 51 and four inner plates 53, and is disposed between a clutch hub 55 (inner member) and an outer member 71, which is coupled to the clutch housing 11. Moreover, the main clutch 13 is disposed in a lapped manner with the pilot clutch 15 to be described later, on the outside thereof in a radial direction.

Specifically, the outer plates 49 and 51 are coupled to the spline portion 57 formed to an inner circumference of the outer member 71 so as to be freely movable in the axial direction. This outer member 71 is disposed so as to surround the main clutch 13 and the clutch hub 55 on the inside thereof in a radial direction, and has one end coupled to the clutch housing 11 movably in an axial direction.

Meanwhile, the inner plates 53 are coupled to a spline portion 59 formed to an outer circumference of the clutch hub 55 so as to be freely movable in the axial direction.

Moreover, the outer plate 51 disposed on the right side of the outer plates 49 is positioned by a snap ring 61, and as below, also serves as a pressing member of the main clutch 13.

On the left end of the clutch hub 55, a pressure receiving portion 63 is formed. The Belleville spring 23 is disposed between this pressure receiving portion 63 and the inner plate 53 on the left end side. The Belleville spring 23 pushes the outer member 71 to the right with the plates 53, 49 and 51 and the snap ring 61 interposed therebetween, thus operating as a return spring.

Note that the material of the outer plates 49 and 51 and the inner plates 53 described above, can be optionally selected from, for example, steel, carbon, paper and the like depending on the strength and durability required from a starting clutch (coupling), and on the suitability to the peripheral environment, such as regarding lubrication.

The clutch hub 55 is coupled to the output shaft 9 by a spline portion 65, and movement thereof to the right is prevented by a snap ring 67 fitted to the output shaft 9. Moreover, the clutch hub 55 is freely rotatably supported on the foregoing support member 45 by a bearing 69.

The pilot clutch 15 is composed of a plurality of outer plates 73 and inner plates 75, and is disposed between the outer member 71 and a cam ring 77 (a second member of the coupling mechanism) of the ball cam 17. The outer plates 73 are coupled to a spline portion 79 formed on the inner circumference of the outer member 71 so as to be freely movable in an axial direction. The inner plates 75 are coupled to a spline portion 81 formed on an outer circumference of the cam ring 77 so as to be freely movable in an axial direction. On the right side of the pilot clutch 15, an armature 83 is disposed. The armature 83 is coupled to the spline portion 79 of the outer member 71 so as to be freely movable in the axial direction, and is positioned by a snap ring 85 fitted to the outer member 71.

On the left side of the pilot clutch 15, a rotor 87 is disposed. An outer circumferential portion of the rotor 87 is coupled to the spline portion 79 of the outer member 71, is positioned by a snap ring 89 fitted to the outer member 71, and is designed to move to the left together with the outer member 71. Moreover, an inner circumferential portion of the rotor 87 is supported on a hollow hub 93 by a needle bearing 91.

The output shaft 9 penetrates this hub 93, and is supported in the hub 93 with a plain bearing 95 interposed therebetween.

Furthermore, the rotor 87 is meshed with an inner gear 99 (drive gear) of an oil pump 97 so as to be relatively freely movable in an axial direction. The oil pump 97 is driven by the driving force of the engine.

The ball cam 17 is disposed between the clutch hub 55 and the cam ring 77. Disposed between the cam ring 77 and the rotor 87 is a thrust bearing 101, transmitting a cam thrust force (amplified pressing force) of the ball cam 17 to the rotor 87 and absorbing the relative rotation of the cam ring 77 and the rotor 87.

The Belleville spring 25 is disposed between a snap ring 103 and the cam ring 77, which are fitted to the ball cam 17. The Belleville spring 25 pushes the cam ring 77 in a direction opposite to that of the cam thrust force of the ball cam 17, thus functioning as a return spring.

The electromagnet 19 is disposed in a concave portion provided in the rotor 87 with a predetermined air gap interposed therebetween. The electromagnet 19 is engaged with a pump casing 105 of the oil pump 97 to be locked, and is supported on the rotor 87 by a ball bearing 107 to be installed thereto in a non-rotational state.

A lead wire 109 connected to this electromagnet 19 is connected to a controller located outside the drawing.

Moreover, a ring 111 made of a non-magnetic material is provided by welding to the rotor 87 in such a manner that the inner and outer circumferences thereof split the rotor 87 into inner and outer portions in a radial direction, thus preventing a short circuit of a magnetic force.

As described above, the main clutch 13 is disposed outside the pilot clutch 15 in a radial direction. And, together with the pilot clutch 15, the main clutch 13 is coupled to the crankshaft 5 with the outer member 71 and the clutch housing 11 interposed therebetween. Moreover, the clutch hub 55 as the inner member of the main clutch 13 is coupled to the output shaft 9, and the ball cam 17 is provided between the clutch hub 55 and the cam ring 77 as an inner member of the pilot clutch 15.

Furthermore, since the clutch hub 55 is designed to be prevented from moving to the right by the snap ring 67, the cam thrust force of the ball cam 17 moves the outer member 71 to the left via the cam ring 77, the thrust bearing 101, the rotor 87 and the snap ring 89, as indicated by an arrow 113.

As described above, the pressing system 21 of the starting clutch 1 (coupling) of the present invention is constituted of the outer member 71, a pilot clutch unit 14, the cam ring 77, the thrust bearing 101, the snap rings 61 and 89.

In this embodiment, the pilot clutch unit 14 includes the pilot clutch 15, the rotor 87, the electromagnet 19 as the operating means and the armature 83.

The controller controls an excitation current to the electromagnet 19.

When the electromagnet 19 is excited, the armature 83 is attracted, and the pilot clutch 15 is connected. By the connected pilot clutch 15, engine torque is applied to the ball cam 17 between the cam ring 77 and the clutch hub 55, and thus a cam thrust force is generated. The foregoing pressing system 21 moves to the left by the cam thrust force. When the pressing system 21 moves to the left, the main clutch 13 is pressed and connected between the outer plate 51 positioned by the snap ring 61 fitted to the outer member 71 and the pressure receiving portion 63 of the clutch hub 55.

In such a manner, the starting clutch 1 is coupled, and the driving force of the engine is transmitted to the wheels via the automatic transmission.

Note that, in the process of coupling the main clutch 13, the relative rotation of the cam ring 77 and the rotor 87 is absorbed by the thrust bearing 101. In this case, the rotor 87 and the outer member 71 positioned by the snap ring 89 are moved together, and sliding portions sliding while receiving the transmitted torque are limited to being on the large-diameter main clutch 13.

Specifically, the sliding portions are between the outer member 71 and the clutch housing 11, between each outer plate 51 and the spline portion 57 formed on the outer member 71 and between each inner plate 53 and the spline portion 59 formed on the clutch hub 55.

By controlling the excitation current of the electromagnet 19, the attraction force to the armature 83 is controlled, and the sliding frictional torque at the pilot clutch 15 (pilot torque) can be controlled. Thus, the cam thrust force generated by ball cam 17 is controlled. The cam thrust force balances by pushing forces of the Belleville springs 23 and 25, and the transmitted torque of the main clutch 13 (starting clutch 1) is determined. Thus, the driving force of the engine transmitted to the wheels is controlled.

By reducing the excitation of the electromagnet 19, the pilot clutch 15 slips, and the cam thrust force of the ball cam 17 is weakened. Thus, the pressing system 21 somewhat returns to the right by the pushing forces of the Belleville springs 23 and 25. Then, the main clutch 13 is slipped, and the transmitted torque of the starting clutch 1 is weakened.

The starting clutch 1 of the present invention can be applied to various transmissions. For the multi-speed automatic transmission, the control described above is carried out. For a non-stage transmission, since the main clutch 13 can be used in a continuously coupled state during speed changes, the above slip control is carried out only at the time of starting.

Meanwhile, for a manual transmission, the above slip control is carried out at the time of starting, and during speed changes, the excitation of the electromagnet 19 is stopped. When the excitation of the electromagnet 19 is stopped, the pilot clutch 15 is released, the ball cam 17 stops generating cam thrust force, the pressing system 21 returns to the right due to the pushing forces of the Belleville springs 23 and 25, the main clutch 13 is released, and the coupling of the starting clutch 1 is released.

In the output shaft 9, an oil line 115 is provided in the axle direction, several oil lines 117 communicating with the oil line 115 are provided in the radial direction, and on a right end of the output shaft 9, a cover 119 preventing oil leak from the oil line 115 is attached.

Oil pressure from the oil pump 97 is partially utilized for a transmission of the automatic transmission. Moreover, the oil pressurized by the oil pump 97 is supplied to the oil lines 115 and 117, then, flushed out of the oil lines 117 by the pressure and a centrifugal force. Subsequently, the oil is given to the plain bearing 95, the needle bearing 91, the thrust bearing 101, the ball cam 17, the pilot clutch 15, the main clutch 13 and the like, which are then lubricated and cooled sufficiently. And the durability thereof is greatly improved.

Moreover, in the cam ring 77, an oil line 121 is provided for increasing an oil amount to the pilot clutch 15, and thus the lubrication and cooling effects for the pilot clutch 15 are enhanced.

As described above, in the starting clutch 1, the main clutch 13 is disposed outside of the pilot clutch 15 in a radial direction, and the members constituting the pressing system 21 of the main clutch 13 are mutually positioned in a pressing direction. In this manner, the portions sliding while receiving the transmitted torque in the event of connecting and disconnecting the main clutch 13 are limited to the following three spots on the side of the main clutch 13. Specifically, the spots are between the outer member 71 and the clutch housing 11, between each outer plate 51 and the spline portion 57 formed on the outer member 71 and between each inner plate 53 and the spline portion 59 formed on the clutch hub 55.

The sliding portions receiving the transmitted torque are limited to be on the side of the large-diameter main clutch 13, thus the radii of the sliding portions ("r" in the foregoing equation (2)) become large, and the force generated in the sliding portions ("F" in the foregoing equation (2)) caused by receiving the torque Ts becomes small. Furthermore, when the force (F) generated in the sliding portions becomes small, the frictional force generated in the sliding portions ("Fs" in the foregoing equation (1)) becomes small.

Figure 2:
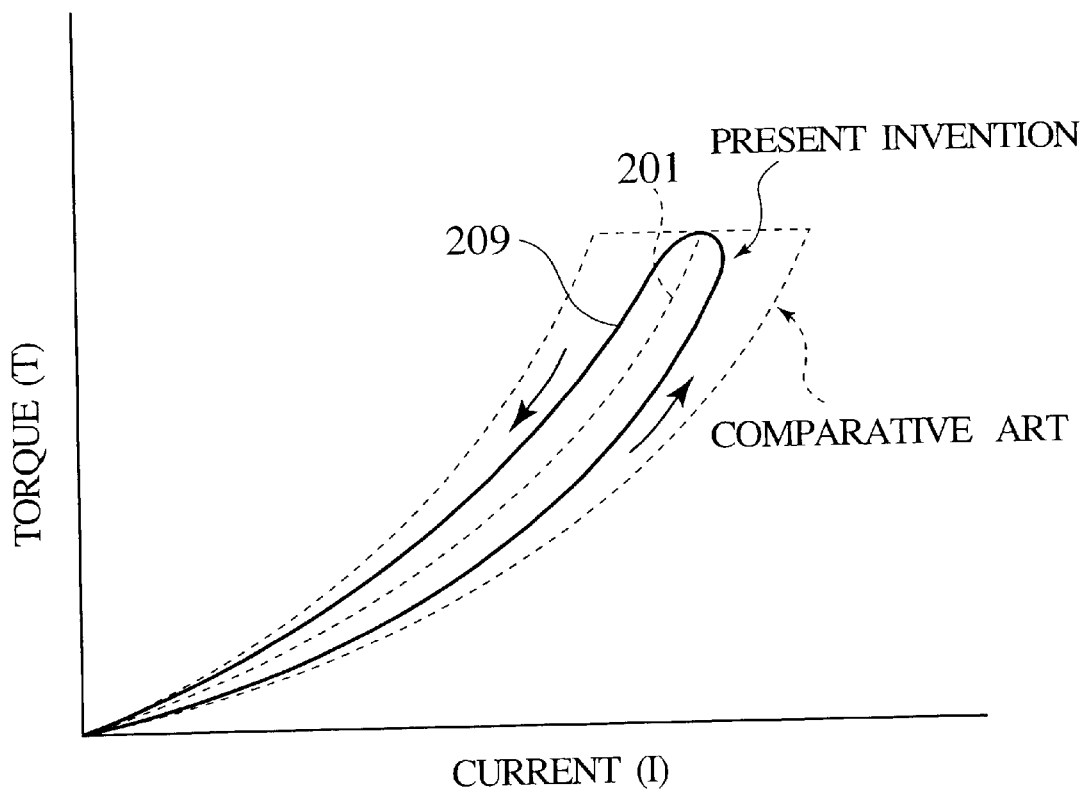
FIG. 2 is a graph showing change in transmitted torque (T) to current value (I) when the transmitted torque is increased and decreased in the coupling of the embodiment, the graph showing the small hysteresis realized by the embodiment.

When the frictional force in the sliding portions ("Fs" in the foregoing equation (1)) becomes small, the frictional resistance applied to the pressing system 21 of the main clutch 13 becomes small. Therefore, as in the curve 209 of FIG. 2, the change of the transmitted torque (T) when the starting clutch 1 (main clutch 13) is coupled or released approximates to an ideal curve 201 which shows change in the transmitted torque (T) in the case of an ideal coupling without any frictional resistance in the sliding portions receiving the transmitted torque. And hysteresis thereof is very small as compared with that of the comparative art shown in FIG. 3.

As the hysteresis becomes small, thus the responsiveness of the transmitted torque (T) to the current value (I) is improved both on a rise, during coupling, and on a fall, during release. Accordingly, more precise control of the torque transmission is accomplished, and road ability, starting and acceleration ability, stability of the vehicle body and the like are improved to a great extent.

Furthermore, since correction of the torque transmission is performed more accurately in response to the secular change of the pilot clutch 15, the ball cam 17 and the like, a torque transmission characteristic of the starting clutch 1 can be controlled precisely for a long period of time, and can be stabilized.

Moreover, a system for detecting the transmitted torque (T) by use of a torque sensor is not required, thus making it possible to avoid complication of the structure and cost increase, which would accompany the use of such a system.

Furthermore, the main clutch 13 is disposed outside the pilot clutch 15 in a radial direction and is made large in diameter, thus obtaining a large clutch capacity. In comparison with a clutch having an equal capacity, the number of the plates 49, 51 and 53 is reduced in the main clutch 13, and accordingly, the main clutch 13 is constituted to be lightweight and compact in an axial direction. Interference thereof with peripheral members is avoided, and the degree of freedom in layout is increased.

Furthermore, even if the ball cam 17 as the coupling mechanism is operated, there no change occurs in the relative positional relation of the outer member 71, the pilot clutch unit 14 and the cam ring 77 as the second member of the coupling mechanism, all of which constitute the pressing system 21. Hence, there is no hysteresis generating element among the respective members of the pressing system 21, and the torque transmission is precisely controlled for a long period of time and stabilized.

Furthermore, the electromagnet 19 is used as the operating means for the pilot clutch 15, and thus, for example, unlike a constitution using a pressure system as the operating means, a pump, a driving source and a pipe thereof and the like become unnecessary. Accordingly, the starting clutch 1 has a simple structure, is low in cost, saves disposition space, is lightweight and compact so has excellent mounting ability, and can obtain high reliability owing to no pressure leak.

Furthermore, the current value (I) of the electromagnet 19 is adjusted, and thus, as described above, the torque transmission can be controlled precisely, and secular change in the torque transmission characteristic can be also corrected precisely. Therefore, a torque transmission characteristic further stabilized for a long period of time can be obtained.

Furthermore, the electromagnet 19 is characterized to be fitted in a non-rotational state to the rotor coupled to the outer member with the bearing interposed therebetween.

During the operations of connecting and disconnecting the clutch, the electromagnet 19 is moved in the axial direction together with the outer member 71 and the rotor 87. However, the electromagnet 19 is non-rotational since the electromagnet 19 is fitted in a non-rotational state to the rotor 87 coupled to the outer member 71 with the ball bearing 107 interposed therebetween. Accordingly, a special electricity-supplying means for a rotating body such as a slip ring is not required, and thus wiring and installation thereof are facilitated.

Moreover, since the main clutch 13 and the pilot clutch 15 are disposed in a lapped manner with each other in the radial direction, the lubricant oil flushed from the shaft center in a radial direction via the oil lines 115 and 117 provided in the output shaft 9 is efficiently supplied to the pilot clutch 15 and the main clutch 13, and lubricates and cools these clutches sufficiently, thus improving the durability thereof to a great extent.

In addition, a multi-plate clutch is used as the main clutch 13, and thus various torque capacities can be obtained by changing the number of the plates 49, 51 and 53. By adjusting the torque transmission characteristic depending on the vehicle, the coupling can be widely applicable to different vehicle types.

Moreover, since the multi-plate clutch can obtain a large clutch capacity owing to the large area of the friction surface, the starting clutch 1 can be lightweight and compact. For example, when the number of the plates 49, 51 and 53 is increased to gain the torque capacity, the enlargement can be avoided in diameter of the clutch, thus road clearance of the vehicle body can be increased, and interference thereof with the peripheral members is prevented. Therefore, mounting ability thereof is further improved.

Furthermore, though the rotor 87 is a part of the pressing system 21 applying a pressing force to the main clutch 13, since the driving force of the engine is transmitted via the clutch housing 11, the outer member 71, the main clutch 13 and the clutch hub 55, the torque is not applied to the rotor 87.

Accordingly, besides welding, as fixing means of the rotor 87 and the ring 111 made of a non-magnetic material, any means capable of obtaining specified strength may be used, such as press attachment, copper soldering and adhesion with a solvent.

Note that the pressing system is not necessarily constituted of a plurality of members as in this embodiment but may be formed of a unitary member.

Moreover, even in the case of constituting the pressing system with a plurality of members, the constitution is not limited to the one in this embodiment, and provided that the respective constituent members are positioned in the pressing direction of the main clutch by a positioning means such as a snap ring, the effect of the present invention can be obtained.

Furthermore, as the main clutch or the pilot clutch, apart from the multi-plate clutch, for example, any form of clutch may be used as long as it is a friction clutch, such as a single-plate clutch and a cone clutch.

Furthermore, these clutches may be either wet or dry.

Furthermore, for clutch plates of the multi-plate clutch and single-plate clutch, any of steel, carbon and paper may be used.

Moreover, the operating means of the pilot clutch is not limited to the electromagnet, and may be, for example, an electric motor, an actuator of fluid pressure and the like.

Furthermore, the output torque member may be on the input side, and the input torque member may be on the output side.

Moreover, in this embodiment, the pilot torque generated by the pilot clutch is converted into the pressing force of the pressing system and amplified by the cam thrust force of the ball cam 17, which is exemplified as the coupling mechanism, but is not limited to this, any coupling mechanism that converts the pilot torque into the pressing force of the pressing system and amplifies the same may be used.

Furthermore, the coupling of the present invention is not limited to the starting clutch and other apparatus for connecting and disconnecting the input and output shafts of the driving system, but it is possible to apply the coupling of the present invention to other purposes such as an apparatus for switching the driving sources of a hybrid vehicle.

What is claimed is:

1. A coupling for vehicles, comprising:
    relatively rotatable input and output members;
    a main clutch for connecting the input and output members; and
    an axially displaceable pressing mechanism for engaging the main clutch, said pressing mechanism including:
        a pilot clutch disposed inside the main clutch;
        a cam element for providing the main clutch with an increased tendency for engagement; and
        a pressing member having an axially extending part on radially outer side of the main clutch, the axially extending part axially slidably engaged with the input member at a first radial location outside the main clutch.

2. The coupling according to claim 1, wherein the main clutch includes a multi-plate clutch having an outer plate axially slidably engaged with the pressing member at a second radial location outside the pilot clutch, and an inner plate axially slidably engaged with the output member at a third radial location outside the pilot clutch.

3. The coupling according to claim 2,
    wherein, during the engagement of the main clutch, drive torque inputted to the input member is transferred to the output member, and
    wherein, while receiving said transferred torque, axial sliding occurs only at said first, second, and third radial locations.

4. The coupling according to claim 1, wherein the main clutch and the pilot clutch are disposed in a lapped manner in a radial direction.

5. A coupling for vehicles, comprising:

input and output rotary members rotatable relative to each other;

a main clutch for connecting the input and output rotary members; and an axially displaceable pressing mechanism for engaging the main clutch, said pressing mechanism including:
  a pilot clutch disposed inside the main clutch;
  a cam element actuatable for generating a thrust to force the main clutch being engaged; and
  a pressing member axially and slidably engaged with the input rotary member at a first location that is radially outside of the main clutch,
  wherein the pressing mechanism further comprises a rotor that is axially and displaceably supported by the output rotary member, and the pilot clutch is operated by an electromagnet supported in a non-rotational state on the rotor with a bearing interposed therebetween.

6. The coupling according to claim 5, wherein the pressing mechanism further includes a thrust bearing interposed between the rotor and the cam element.

7. The coupling according to claim 6, wherein the pressing mechanism is unitarily displaceable with the pilot clutch, cam element, pressing member, rotor, and thrust bearing.

8. The coupling according to claim 5, wherein the rotor is connectable to an auxiliary equipment.

9. A coupling for vehicles, comprising:

input and output rotary members rotatable relative to each other;

a main clutch for connecting the input and output rotary members; and an axially displaceable pressing mechanism for engaging the main clutch, said pressing mechanism including:
  a pilot clutch disposed inside the main clutch;
  a cam element actuatable for generating a thrust to force the main clutch being engaged; and
  a pressing member axially and slidably engaged with the input rotary member at a first location that is radially outside of the main clutch,
  wherein the pilot clutch comprises a multi-plate clutch that includes an outer plate axially and slidably engaged with the pressing member, and an inner plate that is axially and slidably engaged with the cam element.

10. A coupling for vehicles, comprising:

relatively rotatable input and output members;

a main clutch for connecting the input and output members; and an axially displaceable pressing mechanism for engaging the main clutch, the pressing mechanism including:
  a pilot clutch disposed inside of the main clutch;
  a cam element for providing the main clutch with an increased tendency for engagement; and
  a pressing member having an axially extending part on radially outer side of the main clutch, the axially extending part axially slidably engaged with the input member,
  wherein the axially extending part of the pressing member includes a sliding portion to be slid while receiving torque transferred from the input member to the output member during engagement of the main clutch.

* * * * *